Dec. 11, 1956     R. L. HOLLOWAY     2,773,695
REVERSIBLE BICYCLE FRAME
Filed Aug. 12, 1953     2 Sheets-Sheet 1

INVENTOR
ROBERT L. HOLLOWAY
BY
*Tenner J. Ostad*
ATTORNEY

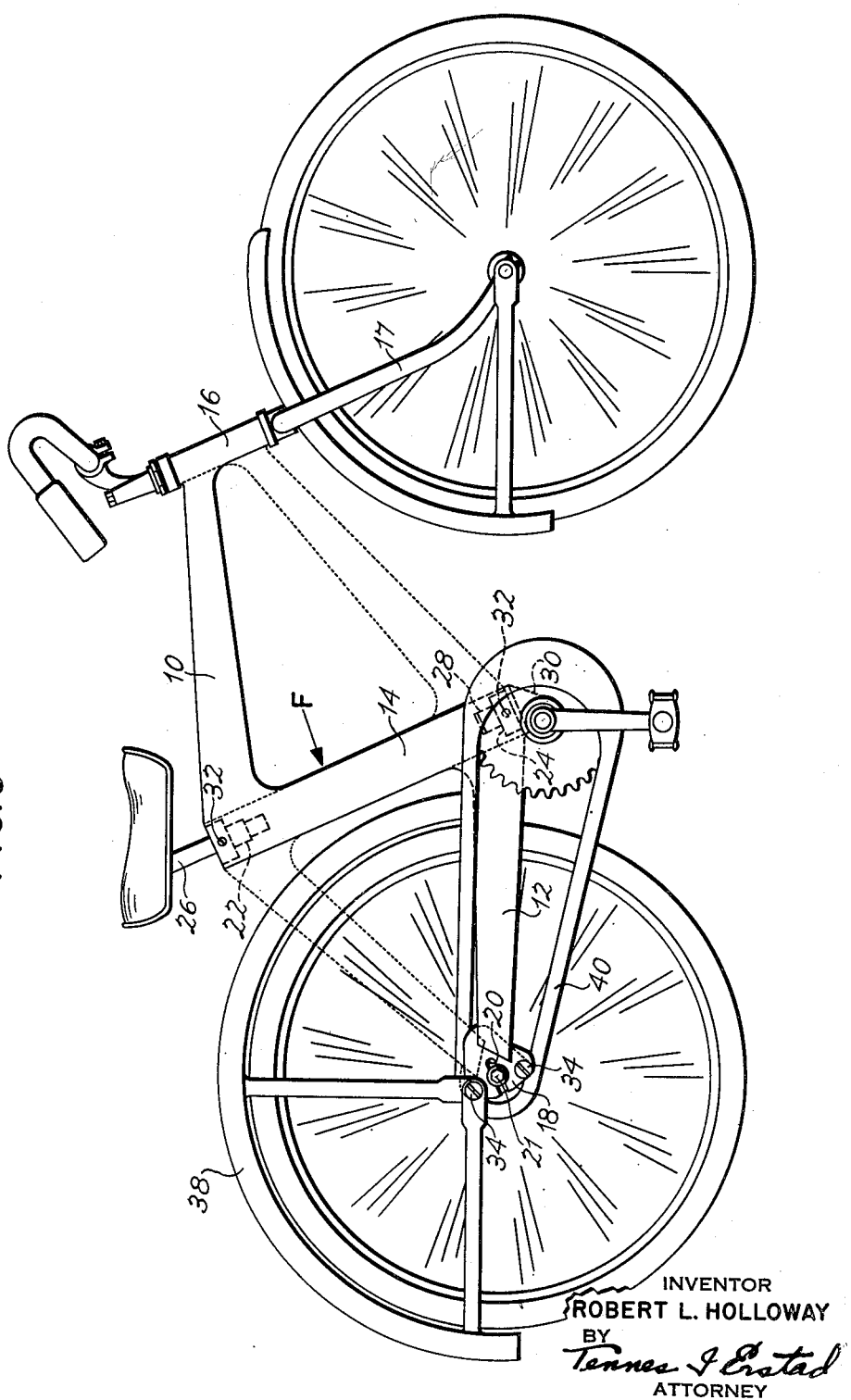

United States Patent Office 2,773,695
Patented Dec. 11, 1956

2,773,695

REVERSIBLE BICYCLE FRAME

Robert L. Holloway, Snyder, N. Y., assignor to American Machine & Foundry Co., a corporation of New Jersey Application August 12, 1953, Serial No. 373,773

2 Claims. (Cl. 280—7.11)

This invention relates to bicycle frame construction and more particularly to frames of simplified construction which can be readily converted into either men's or women's bicycles without any modification of the frame.

As is well known in the art, men's and women's bicycles are of different construction, the former having a cross-bar while the latter has a V-shaped opening which permits a woman to mount the bicycle from the front of the saddle. As a result it has been necessary for manufacturers to manufacture and stock different types of frames for men's and women's bicycles. When the public purchases a bicycle it must choose either a man's or woman's bicycle. The use of the bicycle will be limited by the type of bicycle purchased, although because of changed circumstances, growing children, etc., it might be more desirable to have a bicycle for the opposite sex.

In the past, various attempts have been made to make bicycles interchangeable, but for one reason or another, as far as known, these attempts have not met with public acceptance.

It is therefore an object of this invention to provide a bicycle frame which can be readily made into a man's or woman's bicycle without any structural alterations to the frame.

Another object is to provide a bicycle frame which can be readily inverted by the public to make either man's or a woman's bicycle without requiring any special tools, parts, or alteration to the physical components themselves. This bicycle frame has the general shape of the letter Z when one looks at the frame from the left side of the bicycle and accordingly for expediency of description the frame is identified herein as a Z-shaped frame.

A further object is to provide a simplified bicycle frame construction.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
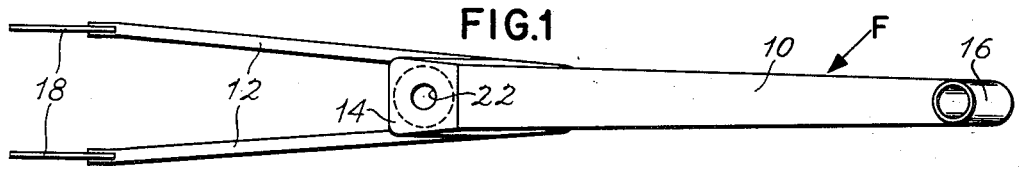
Figure 2:
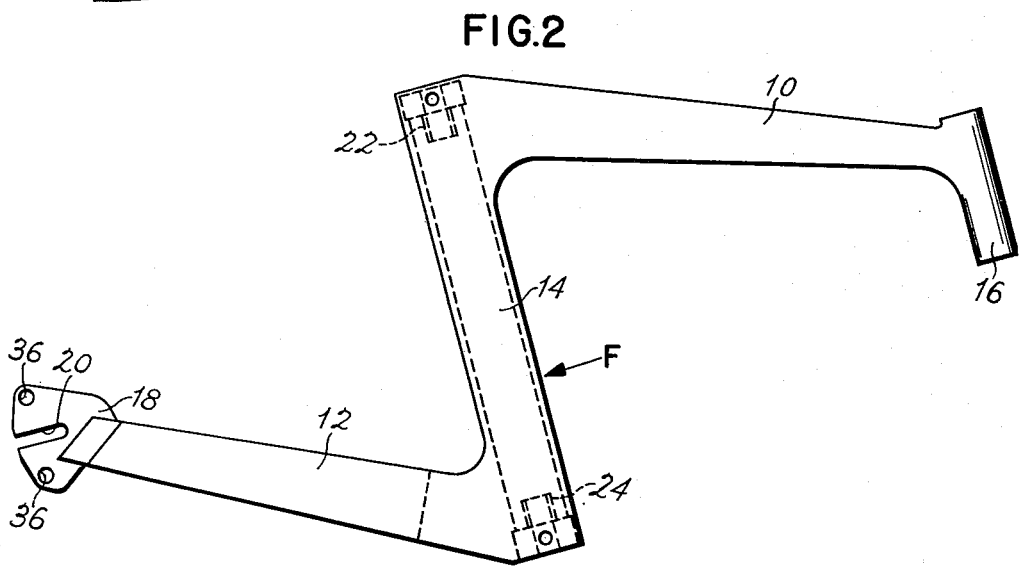
Figure 3:
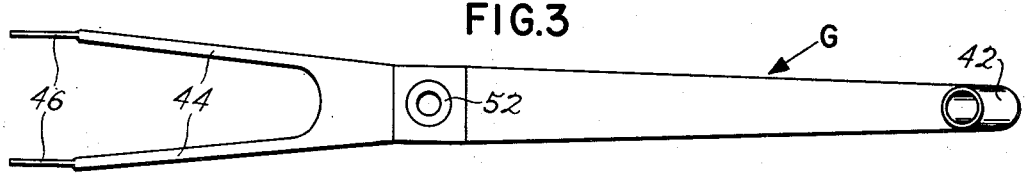
Figure 4:
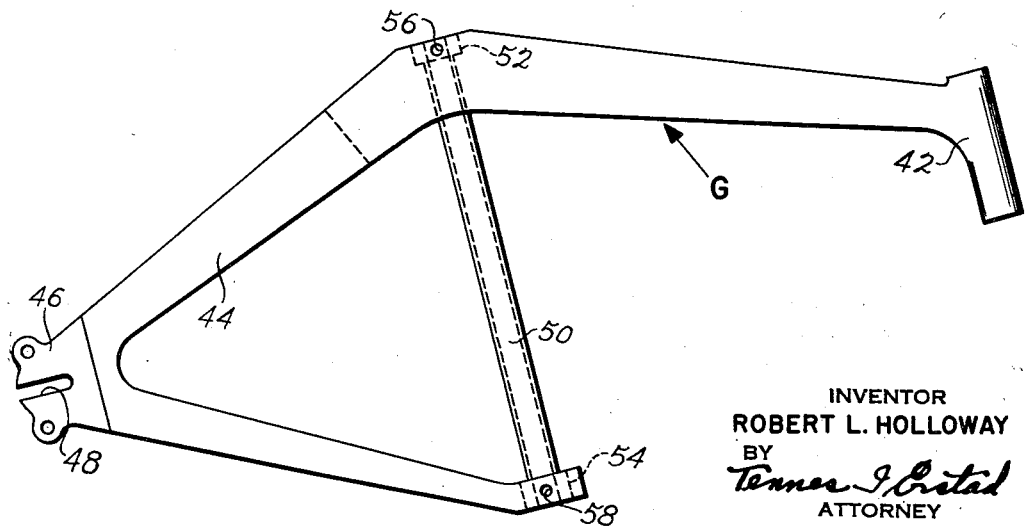

Fig. 1 is a plan view of a reversible bicycle frame of a novel Z-shaped construction, Fig. 2 is a side elevation of the same, Fig. 3 is a plan view of a modified reversible bicycle frame, Fig. 4 is a side elevation of the same, and Fig. 5 is a side elevation of a bicycle illustrating how the Z-shaped frame in one position is used as a boy's bicycle and when inverted it can also serve as a frame for a girl's bicycle.

The Z-shaped invertible bicycle frame F illustrated in Figs. 1 and 2 may be manufactured from any suitable type of material and for purposes of illustrating the invention is shown to consist of an upper tube 10, a lower member 12, and a central saddle pillar or seat tube 14 which connects the upper and lower members, resembling the letter Z in construction. The upper member 10 on its free end carries or is formed into a sleeve or head tube 16 which serves as a bearing for and supports the steering shaft of the bicycle's front fork 17.

The axis of the head sleeve 16 is parallel to a center line passed through the two points on the saddle pillar 14 which receive, indiscriminately, either the crank hangar or seat support. The receiving points for crank hangar or seat support are located equidistant either side of a line through the rear wheel center line and the mid-point of the steering shaft support sleeve 16. This last described line is perpendicular to the steering shaft axis.

The lower member 12 is fork-shaped and carries on its free ends a pair of parallel bearing plates 18 provided with angular slots 20 which support and engage with the protruding studs 21 (Fig. 5) of the rear wheel axle. The angular slots 20 are perpendicular to the saddle tube 14 and a center line drawn along the slots 20 will pass at the mid-point through the saddle tube 14 and head tube 16 and perpendicular to them. The saddle tube 14, which preferably is hollow, carries in its top and bottom ends similarly shaped sleeve bushings 22 and 24 respectively which are axially aligned.

It will therefore be apparent that the frame I have employed is of such design that regardless of whether or not the frame is inverted the wheels, seat, and pedals will always have the same position and angular relationship with respect to one another. As a consequence, the bicycle frame can be changed about at any time, before or after manufacture, so as to make either a boy's or a girl's bicycle.

When the frame F is used in a boy's bicycle, as illustrated in solid lines in Fig. 5, the upper member 10 forms the upper bar which is typical of a man's or boy's bicycle. The sleeve bushing 22 in the saddle tube 14 then supports and carries the saddle shaft 26, while the sleeve bushing 24 engages with a stud shaft 28 which is an integral part of the pedal assembly 30. The saddle shaft 26 and the stud shaft 28 of the pedal assembly 30 are held in the sleeve bushings 22 and 24 respectively by means of suitable set screws 32.

To convert this boy's bicycle into a girl's bicycle one has merely to loosen set screws 32 and pull out the saddle shaft 26 and the stud shaft 28, remove the steering shaft from head sleeve or tube 16, loosen the nuts on studs 21 of the rear axle and slide the latter out of the slots 20 of the bearing plates 18. By removing a pair of screws 34 from the holes 36 of the latter, the rear mud guard 38 and chain guard 40 may also be removed without effort.

The frame F is then inverted from top to bottom or conversely and brought into a position shown in dotted lines in Fig. 5 and the saddle shaft 26 is now inserted in sleeve bushing 24 and the stud shaft 28 in sleeve bushing 22. The steering shaft is put back in sleeve 16 and the rear axle is again secured in slot 20 of the bearing plates 18. After securing the rear mud guard 38 and chain guard 40 again by means of screws 34 to said bearing plates the conversion is completed and the bicycle is now a girl's bicycle without any features which would show that the bicycle has been converted.

The bicycle frame illustrated in Figs. 3 and 4 is a modified form of the reversible frame F shown in Figs. 1, 2, and 5. The frame G, although not of the same shape, has the same general basic geometric configurations that the frame F has. The forward determination of frame G is formed by a sleeve or bearing housing 42 while the rear member 44 is of a forked V-shape the free ends of which are formed into suitable bearing plates 46. Each of the latter is provided with a slot 48 to receive the stud of the axle of the rear wheel.

The center portion of frame G is formed by a tubular member 50 provided with end flanges 52 and 54 properly secured to and set into the top and bottom portion of the frame. Each of flanges 52 and 54 is provided with a threaded hole 56 and 58, respectively, to receive a set screw to secure the saddle shaft and the stud shaft of the pedal assembly, respectively, when used for a boy's bicycle. When frame G is used for a girl's bicycle it is inverted in a similar manner as frame F described above. The saddle shaft is then inserted in flange 54 and the stud shaft of the pedal assembly is secured in flange 52.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A convertible bicycle which is convertible into either a boy's or a girl's bicycle comprising a frame having a head post adapted to have a front fork mounted therein, and a saddle post having identical means at the opposite ends thereof for receiving and fixedly holding a post, a rear fork having one end connected to and extending from one end of said saddle post, a cross bar interconnecting the opposite end of said saddle post to said head post, said saddle post, cross bar and rear fork being of a geometric configuration when viewed from the left side as used for a boy's bicycle which will permit the frame to be turned up-side-down to convert the bicycle into a boy's or girl's bicycle, a seat having a supporting post mounted in that one of said identical means at the upper end of said saddle post, and a pedal crank hanger having a post of substantially the same configuration as said seat post for supporting the crank hanger in that one of said identical means at the lower end of said saddle post.

2. A convertible bicycle which is convertible into either a boy's or a girl's bicycle comprising a frame having a head post adapted to have a front fork mounted therein, and a saddle post having identical means at the opposite ends thereof for receiving and fixedly holding a post, a rear fork having one end connected to and extending from one end of said saddle post, a cross bar interconnecting the opposite end of said saddle post to said head post, said saddle post, cross bar and rear fork being of a Z configuration when viewed from the left side as used for a boy's bicycle which will permit the frame to be turned up-side-down to convert the bicycle into a boy's or girl's bicycle, a seat having a supporting post mounted in that one of said identical means at the upper end of said saddle post, and a pedal crank hanger having a post of substantially the same configuration as said seat post for supporting the crank hanger in that one of said identical means at the lower end of said saddle post.

References Cited in the file of this patent

UNITED STATES PATENTS

| 387,979 | Latta | Aug. 14, 1888 |
| 544,795 | Seaman | Aug. 20, 1895 |
| 676,003 | Kallajian | June 11, 1901 |
| 1,559,276 | Nelson | Oct. 27, 1925 |